(12) United States Patent
Wu et al.

(10) Patent No.: US 9,869,901 B2
(45) Date of Patent: Jan. 16, 2018

(54) METHOD AND MATERIAL FOR MANUFACTURING ALIGNMENT LAYER, DISPLAY SUBSTRATE, AND DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Hailin Xue, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/894,862

(22) PCT Filed: Jun. 26, 2015

(86) PCT No.: PCT/CN2015/082468
§ 371 (c)(1),
(2) Date: Nov. 30, 2015

(87) PCT Pub. No.: WO2016/086652
PCT Pub. Date: Jun. 9, 2016

(65) Prior Publication Data
US 2016/0370657 A1    Dec. 22, 2016

(30) Foreign Application Priority Data
Dec. 5, 2014 (CN) .......................... 2014 1 0743065

(51) Int. Cl.
*C09K 19/36* (2006.01)
*G02F 1/1337* (2006.01)
(Continued)

(52) U.S. Cl.
CPC .... *G02F 1/133753* (2013.01); *C09K 19/2021* (2013.01); *C09K 19/36* (2013.01);
(Continued)

(58) Field of Classification Search
CPC ............ G02F 1/133753; G02F 1/1337; G02F 1/133711; G02F 1/1347;
(Continued)

(56) References Cited

U.S. PATENT DOCUMENTS 5,691,789 A    11/1997  Li et al.
2010/0038587 A1*  2/2010  Nagayama ......... C09K 19/3003
                                       252/299.01

FOREIGN PATENT DOCUMENTS

CN    1669191    9/2005
CN   101148591    3/2008
(Continued)

*Primary Examiner* — Ruiyun Zhang
(74) *Attorney, Agent, or Firm* — Harness, Dickey & Pierce, P.L.C.

(57) ABSTRACT

The present disclosure provides a composition for forming an alignment layer. The composition includes a chiral additive and polymerizable liquid crystal monomers. The composition also includes an initiator for enabling polymerization reactions in the liquid crystal monomers. Further, the polymerizable liquid crystal monomers include at least one of polymerizable cholesteric liquid crystal monomers and polymerizable nematic liquid crystal monomers.

20 Claims, 8 Drawing Sheets

(51) Int. Cl.
  *C09K 19/56* (2006.01)
  *G02F 1/1347* (2006.01)
  *C09K 19/20* (2006.01)
  *C09K 19/38* (2006.01)
  *C09K 19/50* (2006.01)
  *C09K 19/58* (2006.01)

(52) U.S. Cl.
  CPC .......... *C09K 19/3809* (2013.01); *C09K 19/50* (2013.01); *C09K 19/56* (2013.01); *C09K 19/586* (2013.01); *G02F 1/1337* (2013.01); *G02F 1/1347* (2013.01); *G02F 1/133711* (2013.01); *G02F 2001/133726* (2013.01); *G02F 2001/133757* (2013.01); *Y10T 428/10* (2015.01); *Y10T 428/1005* (2015.01)

(58) Field of Classification Search
  CPC .... G02F 2001/133726; C09K 19/2021; C09K 19/36; C09K 19/3809; C09K 19/50; C09K 19/56; C09K 19/586; Y10T 428/10; Y10T 428/1005; Y10T 428/1036
  USPC .......... 428/1.1, 1.2, 1.3; 349/117, 123, 127, 349/182, 183, 185, 191
  See application file for complete search history.

(56) References Cited

FOREIGN PATENT DOCUMENTS

| | | |
|---|---|---|
| CN | 102508378 | 6/2012 |
| CN | 102517035 | 6/2012 |
| CN | 102517035 A * | 6/2012 |
| CN | 103275736 | 9/2013 |
| CN | 104046368 | 9/2014 |
| CN | 104090431 | 10/2014 |
| CN | 104479691 | 4/2015 |

* cited by examiner

METHOD AND MATERIAL FOR MANUFACTURING ALIGNMENT LAYER, DISPLAY SUBSTRATE, AND DISPLAY PANEL

CROSS-REFERENCES TO RELATED APPLICATIONS

This PCT patent application claims priority of Chinese Patent Application No. 201410743065.5, filed on Dec. 5, 2014, the entire content of which is incorporated by reference herein.

FIELD OF THE INVENTION

The present invention generally relates to the display technologies and, more particularly, relates to material used in an alignment layer, a display substrate, and a display panel containing the same.

BACKGROUND

Liquid crystal display (LCD) devices, such as mobile phone displays, laptop displays, navigation device screens, and TV screens, have become widely used in modern life. An alignment layer is often set or formed on the display substrate of an LCD. The alignment layer can provide initial alignment orientations for the liquid crystal molecules. Often, the process to produce the alignment layer may be referred to as the rubbing process. The rubbing process may include the step of rubbing the polyimide layer on the substrate. For example, a liquid crystal display pixel may be divided into four sub-pixels. The alignment layer would then be produced, The rubbing process may then be applied to the sub-pixel areas, When a voltage is applied, multi-domain liquid crystal molecules with different alignment would be formed. However, the rubbing process may require specialized rubbing material and equipment, and may be costly.

The disclosed method and system are directed to solve or partially solve one or more problems set forth above and other problems.

BRIEF SUMMARY OF THE DISCLOSURE

The present disclosure provides a composition, a display substrate containing an alignment layer made of the composition. The present invention further includes the manufacturing method for the display substrate and a display panel containing the display substrate. Embodiments of the present invention may replace the rubbing process that is used to manufacture a display substrate with an alignment layer. Further, embodiments of the present invention may be used together with a rubbing process to produce an alignment layer with multiple domains with different alignment orientations of the liquid crystal molecules. The manufacturing method for the display substrate of the present invention is relatively simple in comparison with conventional methods, such as a method applying a rubbing process over the whole alignment layer.

One aspect of the present disclosure includes a composition for forming an alignment layer. The composition includes a chiral additive and polymerizable liquid crystal monomers. The composition also includes an initiator for enabling polymerization reaction in the liquid crystal monomers. The polymerizable liquid crystal monomers include at least one of polymerizable cholesteric liquid crystal monomers and polymerizable nematic liquid crystal monomers.

Optionally, the chiral additive includes CB15 derivative.
Optionally, the CB15 additive has a molecular formula of and X, Y, and Z may be H or F.

Optionally, the polymerizable liquid crystal monomers have a mass ratio of x in the composition. The chiral additive has a mass ratio of y in the composition. The initiator has a mass ratio of about 0.3x to 0.5x in the composition. Values of x and y satisfy a relationship of $Bx+y=1$, where B ranges from 1.03 to 1.05.

Optionally, the polymerizable cholesteric liquid crystal monomers include 2-methyl-1,4-bis (4-(6'-propenyloxy hexyloxy) benzoyloxy) benzene, and/or the polymerizable nematic liquid crystal polymerizable monomers include 1, 4-bis (4-(6'-propenyloxy hexyloxy) benzoyloxy)-2-toluene.

Optionally, the polymerizable liquid crystal monomers include only the polymerizable cholesteric liquid crystal monomers, only the polymerizable nematic liquid crystal polymerizable monomers, or the polymerizable cholesteric liquid crystal monomers and the polymerizable nematic liquid crystal polymerizable monomers mixed at any suitable mass ratio.

Optionally, the polymerizable liquid crystal monomers include the polymerizable cholesteric liquid crystal monomers and the polymerizable nematic liquid crystal polymerizable monomers.

Optionally, a mass ratio of the CB15 derivative may be 0-10%; a mass ratio of polymerizable cholesteric liquid crystal monomers may be 0-90%, a mass ratio of polymerizable nematic liquid crystal monomers may be 0-90%; and a mass ratio of the initiator may be 5%.

Optionally, the initiator is a photo initiator.
Optionally, the photo initiator includes dual benzoin methyl ether.

Another aspect of the present disclosure includes a display substrate. The display substrate has an alignment layer, where at least a portion of the alignment layer is formed from the composition.

Optionally, the alignment layer includes first regions and second regions arranged in an alternating manner such that when the alignment layer contacts liquid crystal molecules, an initial alignment orientation of the liquid crystal molecules contacting the first regions is different from an initial alignment orientation of the liquid crystal molecules contacting the second regions.

Optionally, the initial alignment orientation of the liquid crystal molecules contacting the first regions differs from the initial alignment orientation of the liquid crystal molecules contacting the second regions by m*D°, where D is less than or equal to 90 and m is any one of 1, 2, 3, and 4.

Optionally, the alignment layer includes a first alignment layer and a second alignment layer on the first alignment layer. The second alignment layer includes a plurality of separated alignment stripes forming the second regions, where the alignment stripes are formed from cured composition. Regions on the first alignment layer between two adjacent alignment stripes form the first regions.

Optionally, when the initial alignment orientation of the liquid crystal molecules contacting the first regions differs from the initial alignment orientation of the liquid crystal molecules contacting the second regions by m*D°, a thickness of the alignment layer satisfies an equation of d=(n=m*D/360)P. In the equation, d is the thickness of the alignment layer, P is a pitch length of liquid crystal molecules formed by the polymerizable liquid crystal monomers, and n is a positive integer.

Optionally, the first regions and the second regions are in a same layer. The first regions and the second regions are formed from the cured composition.

Optionally, the width of the alignment stripe is 1/N of a width of a pixel, where N is a positive integer greater than or equal to 2.

Another aspect of the present disclosure provides a display panel. The display panel includes a display substrate as disclosed.

Another aspect of the present disclosure provides a method for forming a display substrate. The method includes forming an alignment layer on a substrate, wherein at least a portion of the alignment layer is formed from the composition as disclosed.

Optionally, steps for forming the alignment layer on the substrate include the following. A first alignment layer is formed on the substrate. The disclosed composition forms a second alignment layer on the first alignment layer. The second alignment layer includes a plurality of separated alignment stripes formed from cured composition to form the second regions. Regions on the first alignment layer between two adjacent alignment stripes form the first regions.

Optionally, coating apparatus may coat the composition on the first alignment layer to form a second alignment material layer, where an initiator is a photo initiator. A first mask is used for exposing and developing the second alignment material layer. The first mask includes alternating first light-transmitting regions and first opaque regions. Portions of the second alignment material layer corresponding to the first opaque regions may be removed such that the alignment stripes are formed of the composition after exposure.

Optionally, a UV illumination is used for exposing and developing the second alignment material layer. The UV illumination has a UV illumination intensity of about 3 to 7 mW/cm$^2$, an exposure temperature of about 25 to 45 degrees Celsius, and an exposure duration of about 30 to 50 minutes.

Optionally, the portions of the second alignment material layer corresponding to the first opaque regions of the first mask are removed by dichloromethane.

Optionally, a coating apparatus may coat the composition on the substrate to form a composition layer. A second mask is used for exposing and developing the composition layer at a first temperature, where the second mask includes alternating second light-transmitting regions and second opaque regions. Portions of the composition layer corresponding to the second light-transmitting regions form the first regions. A third mask is for exposing and developing the composition layer at a second temperature, where the third mask includes alternating third light-transmitting regions and third opaque regions. Locations of the third light-transmitting regions are the same as locations of the second opaque regions, and locations of the third opaque regions are the same as locations of the second light-transmitting regions. Portions of the composition layer corresponding to the third light-transmitting regions form the second regions.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 2 (a) to FIG. 2 (c) illustrate diagrams of final pitch lengths of the cured composition under different temperatures when the initiator is a photo initiator according to the disclosed embodiments;

FIG. 4 (a) illustrates an alignment layer with a dual-domain display configuration according to the disclosed embodiments;

FIG. 4 (b) illustrates an alignment layer with a three-domain display configuration according to the disclosed embodiments;

FIG. 4 (c) illustrates an alignment layer with a six-domain display configuration according to the disclosed embodiments;

FIG. 5 (a) illustrates another alignment layer with a dual-domain display configuration according to the disclosed embodiments;

FIG. 5 (b) illustrates another alignment layer with a three-domain display configuration according to the disclosed embodiments;

FIG. 5 (c) illustrates another alignment layer with a six-domain display configuration according to the disclosed embodiments;

FIG. 8 (a) illustrates an exemplary multi-domain display configuration according to the disclosed embodiments;

FIG. 8 (b) illustrates another exemplary multi-domain display configuration according to the disclosed embodiments;

FIG. 10 (a) illustrates an alignment layer with a multi-domain display configuration according to the disclosed embodiments, and FIG. 10 (b) illustrates another alignment layer with a multi-domain display configuration according to the disclosed embodiments.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

One aspect of the present disclosure provides a composition for forming the alignment layer. For example, the composition may include a chiral additive, polymerizable liquid crystal monomers, and an initiator. The initiator can enable the polymerization reactions amongst the polymerizable liquid crystal monomers. The polymerizable liquid crystal monomers may include at least one of polymerizable cholesteric liquid crystal monomers and polymerizable nematic liquid crystal monomers. In another example, the composition of the present disclosure may include only polymerizable liquid crystal monomers and an initiator. The polymerizable liquid crystal monomers have chiral characteristics, and thus may function as the chiral additive described above. A chiral material may therefore refer to either the polymerizable liquid crystal monomers, a chiral additive (e.g., a CB15 derivative), or a combination thereof. In addition, the composition of the present disclosure may or may not include materials other than the ones listed herewith. In certain embodiments of the present disclosure, the additional material(s) may or may not affect the properties and functions of the composition described in the present disclosure.

By mixing with the polymerizable liquid crystal monomers, the chiral additive can enable a certain pitch length P to be formed in the mixture of the polymerizable liquid crystal monomers and the chiral additive. By adding the initiator into the mixture, polymerization reaction can take place in the polymerizable liquid crystal monomers such that the polymerizable liquid crystal monomers are cured to form a cured composition to maintain the pitch length P. In certain embodiments of the present disclosure, the composition may include polymerizable liquid crystal monomers and an initiator. By adding the initiator into the mixture, polymerization reaction can take place in the polymerizable liquid crystal monomers such that the polymerizable liquid crystal monomers are cured to form a cured composition to maintain the pitch length P.

The cured composition, with the pitch length P, can be used as the alignment film. When the alignment film (i.e., the cured composition) is in contact with the liquid crystal molecules used for display, the cured composition can induce the liquid crystal molecules contacting the cured composition to align according to the alignment of the liquid crystal molecules on the surface of the cured composition. Thus, the liquid crystal molecules for display can have a predetermined initial alignment orientation. When using the composition for forming the alignment film this way, only the reaction conditions need to be set for the curing reaction of the composition. Compared to conventional rubbing processes, forming alignment film using the composition described in the present disclosure is a straightforward process. The equipment for forming the alignment film is also relatively simple. Thus, embodiments according to the present disclosure reduce the cost for producing the alignment film.

As stated above, the polymerizable liquid crystal monomers may include at least one of polymerizable cholesteric liquid crystal monomers and polymerizable nematic liquid crystal monomers. Since the cholesteric liquid crystal is chiral, optionally, the polymerizable liquid crystal monomers can include a mixture of polymerizable cholesteric liquid crystal monomers and polymerizable nematic liquid crystal monomers such that the pitch length of the polymerizable liquid crystal monomers can be better controlled. In some embodiments, because the cholesteric liquid crystal is chiral the composition of the present disclosure may not include any additional chiral additive.

In the present disclosure, the specific composition of the chiral additive is not limited to the ones described in the embodiments. The present disclosure only requires that the mixture of the chiral additive and the polymerizable liquid crystal monomers can have a predetermined pitch.

In one embodiment of the present disclosure, the chiral additive may contain a CB15 derivative. The CB15 derivative may have high helical twisting power and may be temperature-sensitive. That is, by setting the reaction temperature, the CB15 derivative may enable the mixture containing CB15 and the polymerizable liquid crystal monomers to have varying pitch lengths.

Often, 4'-(2-methylbutyl) of benzonitrile (i.e., CB15) may undergo a hydrolysis reaction and further react with phenol to generate the CB15 derivative.

Figure 6:
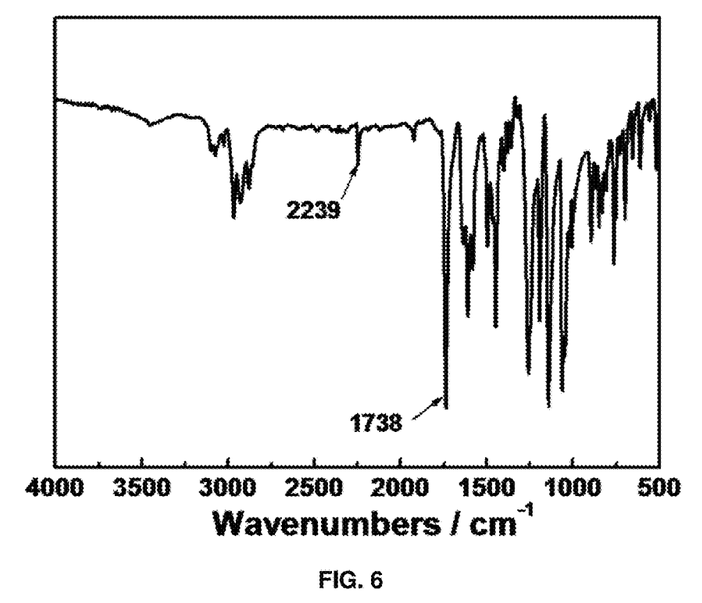
FIG. 6 illustrates the FT-IR (Fourier transform infrared spectroscopy) spectrum of the CB15 derivative according to the disclosed embodiments.
Figure 7:
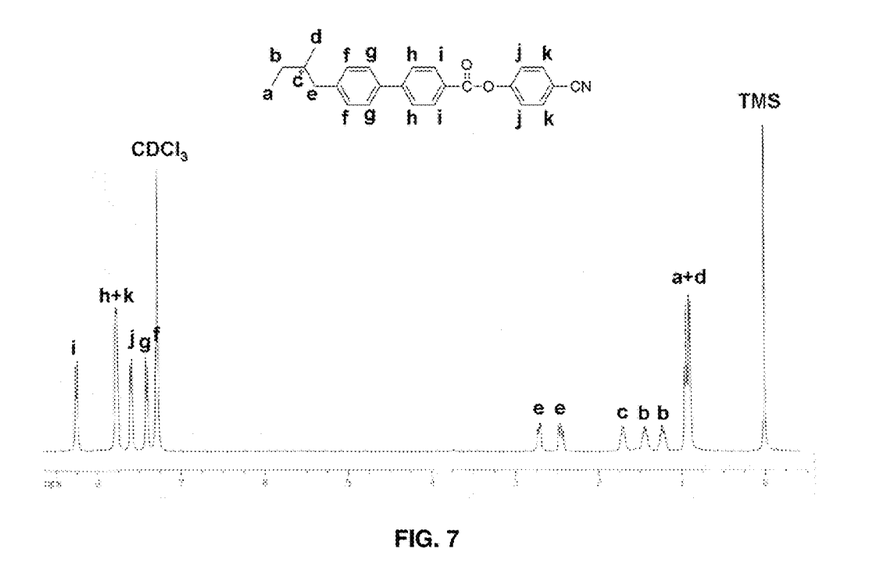
FIG. 7 illustrates H-NMR (Proton nuclear magnetic resonance or hygrogen-1 NMR) spectrum of the CB15 derivative according to the disclosed embodiments.

In one embodiment, the CB15 derivative may have the following molecular formula (I). FIG. 6 illustrates the FT-IR (Fourier transform infrared spectroscopy) spectrum of the CB15 derivative, wherein substituent X is H, and substituents Y and Z are F. FIG. 7 illustrates the H-NMR (Proton nuclear magnetic resonance or hygrogen-1 NMR) spectrum of the CB15 derivative, wherein substituents X, Y, and Z are H.

(I)

In the molecular formula (I), substituents X, Y, and Z each can be H or F.

In one embodiment, the reactions described in (II) and (III) can generate the CB15 derivative.

X, Y, Z = H or F

In the present disclosure, alignment orientation of the final cured composition can be adjusted by adjusting the amount of the chiral additive, the amount of the polymerizable liquid crystal monomers, and/or the polymerization temperature.

Figure 1:
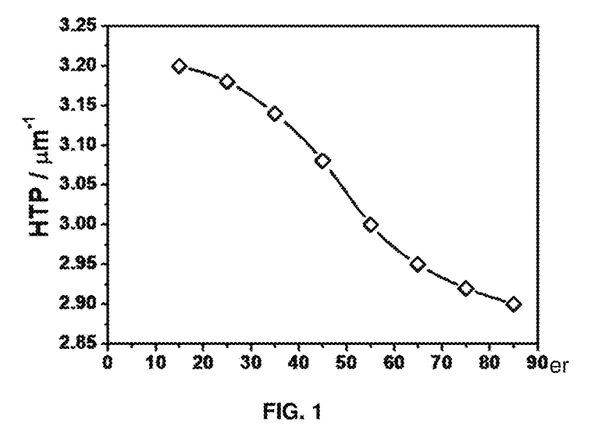
FIG. 1 illustrates variation of the helical twisting power (HTP) of a CB15 derivative as a function of temperature according to the disclosed embodiments.

FIG. 1 illustrates the variation of the helical twisting power (HTP) of the CB15 derivative as a function of temperature. Substituents X, Y, and Z are H. As shown in FIG. 1, the HTP of the CB15 derivative under one temperature condition can vary greatly from the HTP under a different temperature.

Figure 2:
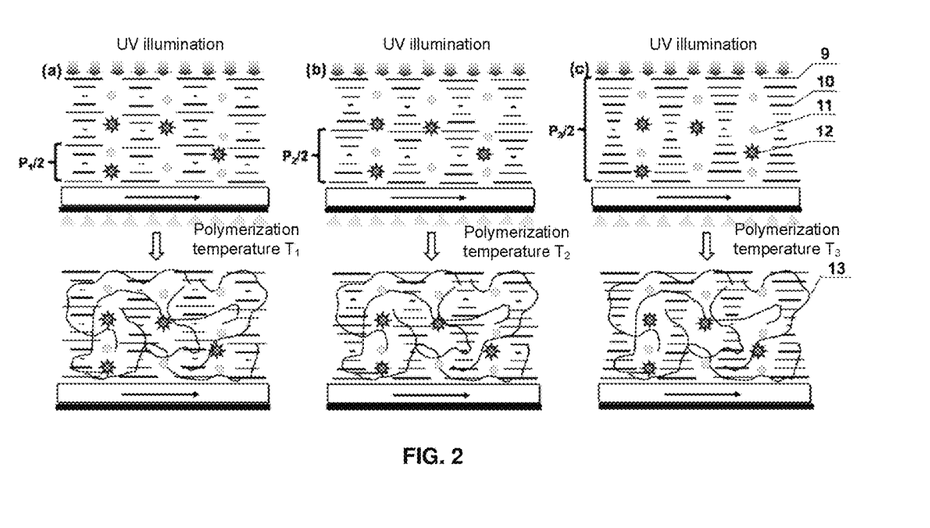

FIG. 2 (a) to FIG. 2 (c) illustrate diagrams of the pitch lengths of the cured composition under different temperatures when the initiator is a photo initiator.

As shown in FIG. 2 (a), when the polymerization temperature is T1, the CB15 derivative can maintain the pitch length of the polymerizable liquid crystal monomers at P1 (shown in the upper portion of FIG. 2 (a)). After being cured by UV illumination, the cured composition may have a structure as shown in the lower portion of FIG. 2 (a).

As shown in FIG. 2 (b), when the polymerization temperature is T2, the CB15 derivative can maintain the pitch length of the polymerizable liquid crystal monomers at P2 (shown in the upper portion of FIG. 2 (b)). After being cured by UV illumination, the cured composition may have a structure as shown in the lower portion of FIG. 2 (b).

As shown in FIG. 2 (c), when the polymerization temperature is T3, the CB15 derivative can maintain the pitch length of the polymerizable liquid crystal monomers at P3 (shown in the upper portion of FIG. 2 (c)). After being cured by UV illumination, the cured composition may have a structure as shown in the lower portion of FIG. 2 (c).

From FIGS. 2 (a) to 2(c), the thinner straight lines 9 may represent polymerizable nematic liquid crystal monomers. The thicker straight lines 10 may represent polymerizable cholesteric liquid crystal monomers. The circular markers 11 may represent the photo initiator. The star markers 12 may represent the chiral additive. The curvy lines 13 may represent a network formed through the curing process.

Optionally, the polymerizable liquid crystal monomers may have a mass fraction of x in the composition, and the chiral additive may have a mass fraction of y in the composition. The mass fraction of the initiator can range between 0.03x and 0.05x. Also, x and y may satisfy the following equation:

Bx+y=1, wherein B may be between 1.03 and 1.05 and y may be between 0.02 and 0.15.

When preparing for the composition, the amount of the chiral additive can be determined first. The amount of the initiator and the amount of the polymerizable liquid crystal monomers can then be determined based on the above formula.

In the present disclosure, the polymerizable liquid crystal monomers may include at least one of polymerizable cholesteric liquid crystal monomers and polymerizable nematic liquid crystal monomers.

In one embodiment of the present disclosure, the polymerizable liquid crystal monomers may only include polymerizable cholesteric liquid crystal monomers. In another embodiment of the present disclosure, the polymerizable liquid crystal monomers may only include polymerizable nematic liquid crystal monomers. In another embodiment of the present disclosure, the polymerizable liquid crystal monomers may include polymerizable cholesteric liquid crystal monomers and the polymerizable nematic liquid crystal monomers mixed at any suitable mass ratio.

Optionally, the polymerizable cholesteric liquid crystal monomers may include 2-methyl-1,4-bis (4-(6'-propenyloxy hexyloxy) benzoyloxy) benzene. The 2-methyl-1,4-bis (4-(6'-propenyloxy hexyloxy) benzoyloxy) benzene may have the following molecular structure (IV).

(IV)

Optionally, the polymerizable nematic liquid crystal monomers may include 1,4-bis (4-(6'-propenyloxy hexyloxy) benzoyloxy)-2-toluene. The 1,4-bis (4-(6'-propenyloxy hexyloxy) benzoyloxy)-2-toluene may have the following molecular structure (V).

(V)

In the present disclosure, the specific type of the initiator is not limited to the ones identified in the embodiments. For example, the initiator may include a photo initiator. The advantage of using a photo initiator as the initiator will be described later in this disclosure.

In one embodiment of the present disclosure, the photo initiator may include dual benzoin methyl ether. The dual benzoin methyl ether may have the following molecular structure (VI).

(VI)

Another aspect of the present disclosure provides a display substrate. The display substrate may include an alignment layer. At least a portion of the alignment layer may be formed by the composition as described in the present disclosure.

As stated above, by using the disclosed composition to form at least a portion of the alignment layer, the formation process may only require polymerization of the composition. The formation process may not need a rubbing process. Thus, the process for manufacturing the display substrate in the present disclosure is relatively simple and of low cost.

In embodiments of the present disclosure, the entire alignment layer can be made from the composition. By adjusting the thickness of the alignment layer and the curing condition of the composition, the alignment orientation of the alignment layer can be adjusted.

The display substrate can be an array substrate, and/or a color filter substrate.

Figure 4:
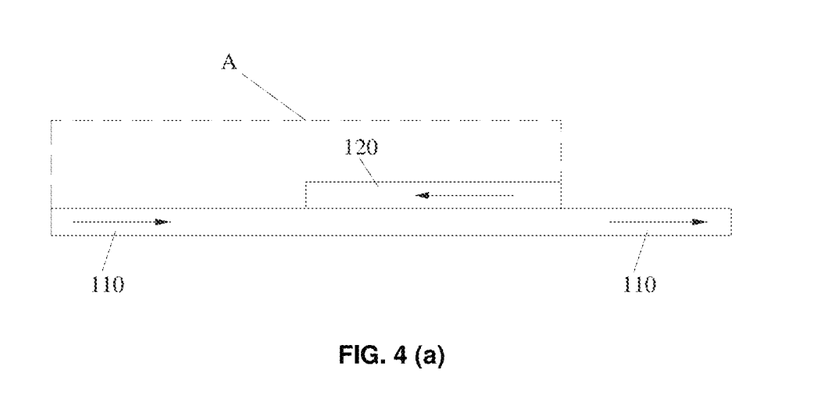
Figure 5:
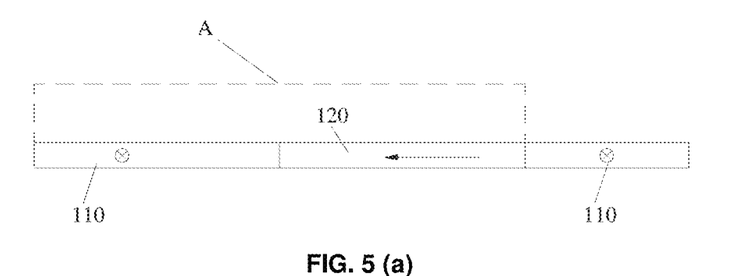
Figure 9:
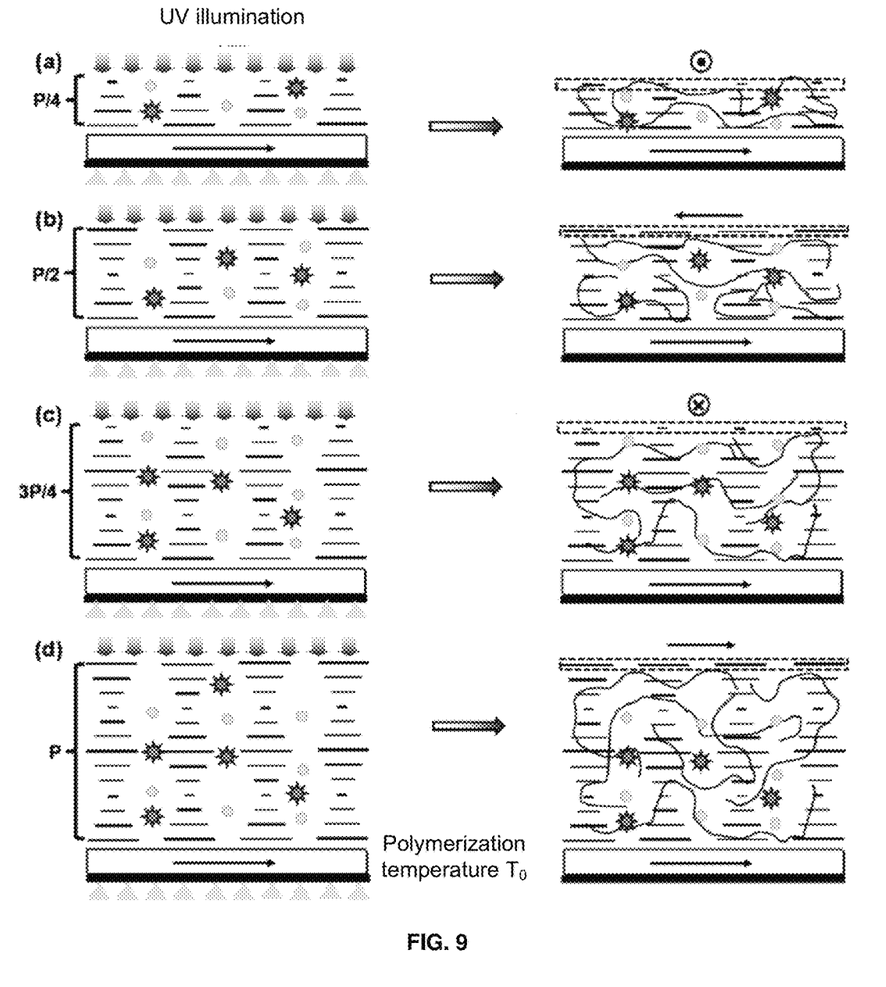
FIG. 9 illustrates alignment orientations of alignment layer with varying thicknesses according to the disclosed embodiments, wherein the alignment layer contains CB15-containing cholesteric liquid crystal polymer.
Figure 10:
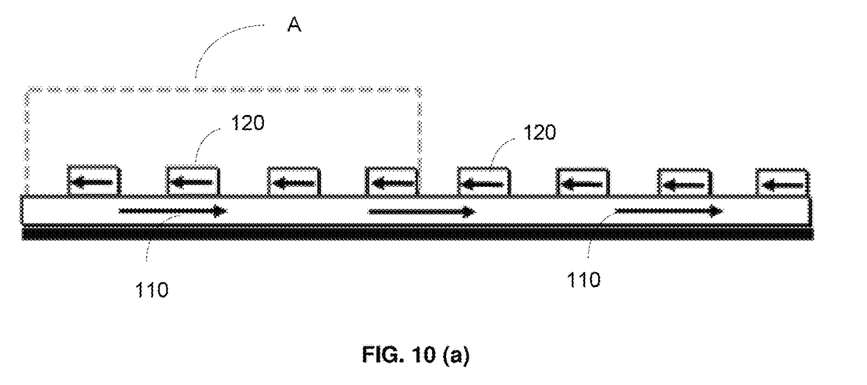

To realize multi-domain display on the display panel, which includes the display substrate, the alignment layer may optionally have alternating first regions 110 and second regions 120, as shown in FIGS. 4 (*a*) to (*c*) and FIGS. 5 (*a*) to (*c*). For example, one first region 110 may be arranged between two adjacent second regions 120, and vice versa. When the alignment layer is in contact with liquid crystal molecules, the initial alignment orientation of the liquid crystal molecules in contact with the first regions 110 may differ from the initial alignment orientation of the liquid crystal molecules in contact with the second regions 120. In FIGS. 4 (*a*) to (*c*) and FIGS. 5 (*a*) to (*c*), the direction of an arrow may represent the initial alignment orientation of the liquid crystal molecules when the liquid crystal molecules are in contact with the alignment layer. A ⊗ symbol may represent that the initial orientation of the liquid crystal molecules is perpendicular to the paper inward. A ⊙ symbol may represent that the initial orientation of the liquid crystal molecules is perpendicular to the paper outward. For example, FIG. 9 illustrates the alignment orientation of an alignment layer of varying thicknesses when the polymerization temperature is T0. The alignment layer may contain CB15-containing cholesteric liquid crystal polymer.

The disclosed composition may form the first regions 110 and/or second regions 120. Often, the initial alignment orientation of the liquid crystal molecules in contact with the first regions 110 may differ from of the initial alignment orientation of the liquid crystal molecules in contact with the second regions 120 by m*D°, where D equals to or is less than 90° and m can be 1, 2, 3, or 4. In other words, the initial alignment orientation of the liquid crystal molecules in contact with the first regions 110 may differ from of the initial alignment orientation of the liquid crystal molecules in contact with the second regions 120 by 90°, 180°, or 270°. D can also be any other values such as 45°. The initial alignment orientation of the liquid crystal molecules in contact with the first regions 110 may differ from of the initial alignment orientation of the liquid crystal molecule in contact with the second regions 120 by 45°, 90°, or 135°. In the embodiments shown in FIGS. 4 (*a*) to (*c*), the initial alignment orientation of the liquid crystal molecules in contact with the first regions 110 may differ from of the initial alignment orientation of the liquid crystal molecules in contact with the second regions 120 by 180°. In the embodiments shown in FIGS. 5) to (*c*), the initial alignment orientation of the liquid crystal molecules in contact with the first regions 110 may differ from of the initial alignment orientation of the liquid crystal molecule in contact with the second regions 120 by 90°.

In one embodiment of the present disclosure, as shown in FIGS. 4 (*a*) to (*c*), the alignment layer can include a first alignment layer and a second alignment layer. The second alignment layer may be on the first alignment layer. The second alignment layer may include a plurality of alignment stripes. A certain distance may separate two adjacent alignment stripes. The alignment stripes may form the second regions 120. The portion between two adjacent alignment stripes on the first alignment layer may form a first region 110. The disclosed composition can form the alignment stripes after being cured. In the present disclosure, the material and method for forming the first alignment layer should not be limited to the ones described in the embodiments. For example, the first alignment layer can be formed from the composition provided by the present disclosure, and/or using conventional rubbing process.

Figure 3:
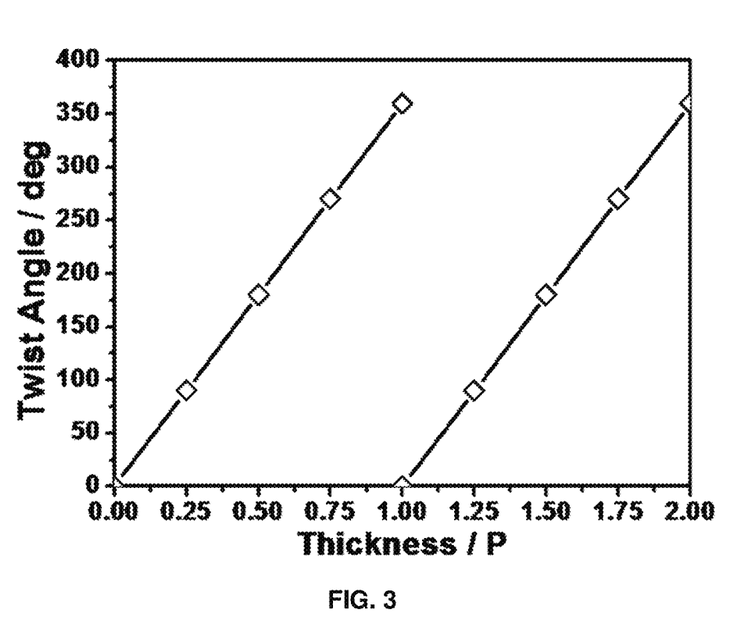
FIG. 3 illustrates relationships between the thickness and alignment orientation angle of an alignment stripe of the alignment layer according to the disclosed embodiments.

Because the chiral additive in the composition can determine the pitch length of the alignment stripes, the alignment orientation of the liquid crystal molecules in the cured composition may be correlated with the thickness of the alignment stripes. Because the alignment orientation of the liquid crystal molecules are already formed in the first alignment layer, and the main composition of the first alignment layer is liquid crystal liquid molecule, the liquid crystal molecules of the disclosed composition may have an initial alignment orientation when they are in contact with the first alignment layer. Thus, when the initial alignment orientation of the liquid crystal molecules contacting the first regions 110 differs from the initial alignment orientation of the liquid crystal molecules contacting the second regions 120 by m*D°, the thickness of the alignment stripes may be $d=(n+m*D/360)P$, wherein d is the thickness of the alignment stripes, P is the pitch length of the liquid crystal molecules formed from the polymerizable liquid crystal monomers, and n is a positive integer. FIG. 3 illustrates the relationship between the thickness of the alignment stripes and the twist angle between the alignment stripes and the first regions.

In this embodiment, when m is 1, the difference (i.e., the twist angle) between the alignment orientation of the alignment stripes and alignment orientation of the first regions may be D°. When m is 2, the difference between the alignment orientation of the alignment stripes and alignment orientation of the first regions may be 2D°. When m is 3, the difference between the alignment orientation of the alignment stripes and alignment orientation of the first regions may be 3D°.

In another embodiment of the present disclosure, the first regions 110 and the second regions 120 may optionally be in the same layer. The first regions 110 and the second regions 120 may both be formed using the composition described in the present disclosure. The method to implement the above embodiment is described below.

Further, the width of the alignment stripe can be 1/N of the width of a pixel, where N is an integer greater than or equal to 2. A mask may be used to set the width of the alignment stripes.

Referring to FIGS. 4 (*a*) to 5 (*c*), the dashed-line box may represent a pixel. In FIGS. 4 (*a*) and 5 (*a*), N is 2, and the display panel containing the display substrate, may have a dual-domain display. In FIGS. 4 (*b*) and 5 (*b*), N is 3, and the display panel containing the display substrate may have a three-domain display. In FIGS. 4 (*c*) and 5 (*c*), N is 6. The display panel containing the display substrate may have a six-domain display. It is noted that the embodiments should not limit the values of N. N can be other integers, such as the integers greater than 6. For example, in FIGS. 10 (*a*) and (*b*), N is 8, and the display panel containing the display substrate may be a multi-domain (e.g., eight-domain) display.

Figure 8:
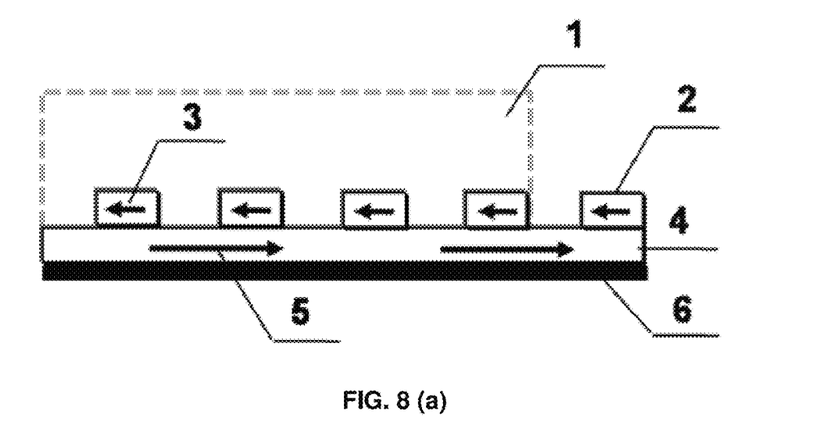

FIGS. 8 (a) and (b) illustrate embodiments of multi-domain display in a pixel. For example, in the embodiment shown in FIG. 8 (a), numeral 1 may represent a single pixel and 2 may represent the alignment layer made of the cholesteric liquid crystal polymer. The alignment layer 2 may include a plurality of separate alignment stripes. The alignment layer 2 may contain the CB15 derivative. Numeral 3 may represent the alignment orientation of liquid crystal molecules in the alignment stripes of the alignment layer 2. Numeral 4 may represent a regular alignment layer. Further, numeral 5 may represent the alignment orientation of the normal alignment layer 4, and 6 may be a glass substrate. In the embodiment shown in FIG. 8 (b), numeral 7 may be another alignment layer made of the cholesteric liquid crystal polymer. Numeral 7 can include a plurality of alignment stripes. One alignment stripe of 7 can be adjacent to two alignment stripes of the existing alignment layer made of cholesteric liquid crystal polymer. Numeral 8 may represent the alignment orientation of liquid crystal molecules in 7.

In one embodiment, to manufacture a LCD containing the multi-domain display configuration provided in the present disclosure, certain process, e.g., a rubbing process, can be used to form a regular alignment layer on the glass substrate. FIG. 8 (a) illustrates an alignment orientation 5 of the regular alignment layer. The coating equipment can spray, spin, or coat a layer of mixture of the disclosed composition on the regular alignment layer. For example, the composition may contain the CB15 derivative, polymerizable cholesteric liquid crystal monomers, polymerizable nematic liquid crystal monomers, and photo initiator. Since the composition may contact the regular alignment layer directly, the polymerizable liquid crystal monomers molecules, having direct contact with the regular alignment layer, may align according to the alignment orientation of the regular alignment layer. As the thickness of the composition increases, the alignment orientation of the composition may gradually start to twist, and the liquid crystal molecules on the surface of the composition may have a different alignment orientation, shown as 3 in FIG. 8(a), compared to the alignment orientation of the regular alignment layer. Further, the composition can be heated up such that the composition can form a certain pitch length. In one example, the composition can be illuminated with UV light with an intensity of 5 mW/cm² through a mask. The illumination duration can be 40 minutes. Crosslinking reaction can take place in the portion of the polymerizable cholesteric liquid crystal monomers and the polymerizable nematic liquid crystal monomers illuminated by the UV light to form liquid crystal polymer with a certain pitch length. That is, the alignment orientation of the surface of the liquid crystal polymer can be pre-determined.

Further, certain solvents can be used to dissolve or remove portions of the polymerizable cholesteric liquid crystal monomers and the polymerizable nematic liquid crystal monomers not illuminated by the UV light (i.e., the unreacted portions polymerizable cholesteric liquid crystal monomers and the polymerizable nematic liquid crystal monomers) to form an alignment layer with a different alignment orientation from that of the regular alignment layer. The formed alignment layer may contain the CB15 derivative and the cholesteric liquid crystal polymers.

Thus, in one pixel, liquid crystal molecules having direct contact with the regular alignment layer may align or arrange according to the alignment orientation of the regular alignment layer. Liquid crystal molecules having direct contact with the cholesteric liquid crystal polymer may arrange according to the alignment orientation of the cholesteric liquid crystal polymer. Accordingly, the above alignment process or arrangement can form a plurality of alignment orientations of the liquid crystal molecules in one pixel. As shown in FIG. 8 (a), the above process produces multiple alignment orientations of the liquid crystal molecules in one pixel.

In addition, a heating process can be used to heat up the composition that was not illuminated by the UV light at a different temperature such that another pitch length can form in the composition. A different mask can be used for the UV illumination on the polymerizable cholesteric liquid crystal monomers and the polymerizable nematic liquid crystal monomers such that crosslinking reaction can take place in the composition to set the pitch length. As a result, an alignment layer with a different alignment orientation than the adjacent (i.e., existing) areas of alignment layer can be formed such that different alignment orientations of liquid crystal molecules, i.e., multi-domain display, can be formed in one pixel, as shown in FIG. 8(b). The multi-domain alignment layer can be made of cholesteric liquid crystal polymer.

The mass ratio of the CB15 in the composition, the mass ratio of the polymerizable cholesteric liquid crystal monomers in the composition, polymerization temperature, and the thickness of the alignment layer can affect the alignment orientation of the CB15-containing cholesteric liquid crystal polymer, i.e., the alignment orientation of the liquid crystal molecules on the surface of the cholesteric liquid crystal polymer. Since the CB15 derivative is chiral and may have significantly more helical twisting power, the pitch length P of the composition may decrease (increase) corresponding to an increasing (decreasing) mass ratio of the CB15 derivative. When the mass ratio of the polymerizable cholesteric liquid crystal monomers, the thickness of the cholesteric liquid crystal polymer alignment layer, and the polymerization temperature are set, the pitch length P may change in response to the change of the CB15 derivative mass ratio. Therefore, the arrangement of the liquid crystal molecules on the surface of the corresponding alignment layer, i.e., the alignment orientations of the corresponding alignment layer, may vary according to the variation of the pitch length P.

Another aspect of the present disclosure provides a display panel. The display panel may include the display substrate. The display substrate may be the display substrate described in the present disclosure.

The display panel may include an array substrate and a color filter substrate corresponding to the array substrate. In the present disclosure, the array substrate and the corresponding color filter substrate can both be made from the display substrate as described in the embodiments according to the present disclosure. Alternatively, one of the array substrate and the corresponding color filter substrate can be made from the display substrate as described in the embodiments according to the present disclosure.

Another aspect of the present disclosure provides a method for forming the display substrate. The method may include forming an alignment layer on the substrate. The composition as described in the embodiments according to the present disclosure may form at least a portion of the alignment layer.

To implement multi-domain display, the alignment layer may include alternating first regions and second regions. When the alignment layer is in contact with the liquid crystal molecules, the initial alignment orientation of the liquid crystal molecules in contact with the first regions may differ from the initial alignment orientation of the liquid crystal molecules in contact with the second regions.

Optionally, the initial alignment orientation of the liquid crystal molecules contacting the first regions 110 may differ from the initial alignment orientation of the liquid crystal molecules contacting the second regions 120 by m*D°, wherein m may be 1, 2, 3, or 4.

The formation process of the display substrate with the alignment layer shown from FIGS. 4 (a) to (c) is illustrated below. The process to form the alignment layer on the substrate may include the following steps.

Certain materials, e.g., the composition described in the embodiments of the present disclosure, can form a first alignment layer on the substrate.

The composition provided in the present disclosure can form a second alignment layer on the first alignment layer. The second alignment layer may include a plurality of alignment stripes. The alignment stripes may form the second regions. The portions on the first alignment layer between two adjacent alignment stripes can form the first regions. The cured composition can form the alignment stripes.

In the present disclosure, the embodiments should not limit the materials and methods for forming the first alignment layer. For example, the compound described in the present disclosure can form the first alignment layer. Conventional rubbing process can also be used to form the first alignment layer.

When the initiator is a photo initiator, the steps to form the second alignment layer on the first alignment layer may include the following steps.

Certain equipment can spin, spray, or coat the composition provided in the present disclosure on the first alignment layer to form the second alignment material layer.

A first mask can be used for exposing and developing the second alignment material layer. The first mask can include first light-transmitting regions and first opaque regions. The first light-transmitting regions and the first opaque regions may be arranged in an alternating manner such that one first light-transmitting region can be arranged between two first opaque regions, and vice versa.

Portions of the second alignment material layer corresponding to the first opaque regions of the first mask can be removed. The second alignment layer after the exposure may form alignment stripes.

In one example, UV light can illuminate the second alignment material layer. The UV light may have an intensity ranging from about 3 to 7 mW/cm$^2$. An exposure temperature may range from about 25 degrees Celsius to 45 degrees Celsius. An exposure duration can be from about 30 minutes to 50 minutes.

In the present disclosure, certain solvents can remove portions of the second alignment material layer corresponding to the first opaque regions of the first mask. For example, the solvent can be dichloromethane.

Further, when the initial alignment orientation of the liquid crystal molecules in contact with the first regions differs from the initial alignment orientation of the liquid crystal molecules in contact with the second regions by m*D°, the thickness of the alignment stripes may satisfy the equation d=(n+m*D/360)P, wherein d is the thickness of the alignment stripes, P is the pitch length of the liquid crystal molecules formed from the polymerizable liquid crystal monomers, and n is a positive integer.

The method for forming the display substrate with the alignment layer shown from FIGS. 5 (a) to (c) is illustrated below. In FIGS. 5 (a) to (c), the initiator may be a photo initiator. The process to form the alignment layer on the substrate may include the following steps.

Certain manufacturing equipment can spin, spray, or coat the composition provided in the present disclosure on the substrate to form a composition layer.

A photolithography process can be used for exposing and developing the composition layer using a second mask. The temperature for the photolithography process may be a first temperature. The second mask may include second light-transmitting regions and second opaque regions. The second light-transmitting regions and the second opaque regions may be arranged in an alternating manner such that one second light-transmitting region can be arranged between two second opaque regions, and vice versa. Portions of the composition layer corresponding to the second light-transmitting regions may form the first regions.

A photolithography process can be used for exposing and developing the composition layer using a third mask. The temperature for the photolithography process may be a second temperature. The third mask may include third light-transmitting regions and third opaque regions. The third light-transmitting regions and the third opaque regions may be arranged in an alternating manner such that one of the third light-transmitting region can be arranged between two of the third opaque regions, and vice versa. Locations of the third light-transmitting regions and locations of the second opaque regions may be the same. Locations of the third opaque regions and locations of the second light-transmitting regions may be the same. Portions of the composition layer corresponding to the third light-transmitting regions may form the second regions.

In the present disclosure, the substrate can be an array substrate, and/or a color filter substrate.

In one embodiment of the present disclosure, the following steps can be used to produce the display substrate.

Step S1: a coating apparatus can spray or spin or coat a layer of polyimide on a glass substrate and cure the polyimide layer.

Step S2: a rubbing process is used to rub the polyimide layer such that the polyimide layer can have a first alignment orientation. The polyimide layer after the rubbing process can be the first alignment layer.

Step S3: CB15 derivative (substituents X, Y, and Z are H), polymerizable cholesteric liquid crystal monomers, and photo initiator can be mixed according to a mass ratio of 2.0%-93.3%-4.7% to obtain the composition. The pitch length of the composition may gradually increase with increasing temperature. For example, at 45 degrees Celsius, the pitch length of the composition may be 80 nm.

Step S4: a coating apparatus can spin, spray, or coat a layer of composition on the first alignment layer. The thickness of the composition layer may be 200 nm. S4 may be operated in a dark environment.

Step S5: illumination equipment may illuminate the composition layer produced in S4 using the first mask at 45 degrees Celsius. The illuminating UV light can have an intensity of 5 mW/cm$^2$. The illumination duration may be 40 minutes such that the illuminated portion of the polymerizable cholesteric liquid crystal monomers can have crosslinking reactions to form cholesteric liquid crystal polymer.

Step S6: dichloromethane can be used to remove the portion of the polymerizable cholesteric liquid crystal monomers not illuminated by UV light (i.e., the unreacted polymerizable cholesteric liquid crystal monomers) to form the second alignment layer on the first alignment layer. The alignment orientation of the alignment stripes of the second alignment layer and the alignment orientation of the first alignment layer may form an angle of 180°.

In another embodiment of the present disclosure, the method for forming the display substrate may use steps S1 to S6 described above. However, the method may use conditions in steps S3 to S5 that are different from those in the previous embodiment.

For example, the composition obtained from step S3 may contain CB15 derivative with different substituents. The substituents X and Z may be H and the substituent Y may be F. The polymerizable liquid crystal monomers may include polymerizable cholesteric liquid crystal monomers and polymerizable nematic liquid crystal monomers. The CB15 derivative, polymerizable cholesteric liquid crystal monomers, polymerizable nematic liquid crystal monomers, and photo initiator may be mixed according to a mass ratio of 5.0%-20.0%-70.5%-4.7%. At 35 degrees Celsius, the pitch length of the composition can be 480 nm.

In step S4, a coating apparatus can spin, spray, or coat a layer of the composition on the first alignment layer. The thickness of the composition layer may be 360 nm.

In step S5, an illumination apparatus may illuminate the composition at 35 degrees Celsius.

In the above embodiment, the alignment orientation of the alignment stripes and the alignment orientation of the first alignment layer may form an angle of 270°.

In another embodiment, the method for forming the display substrate may use steps S1 to S6 with different conditions in steps S1, and S3 to S5 in comparison to the conditions used in the previous embodiments.

In step S1, the first alignment layer is made of polyvinyl alcohol (PVA).

In step S3, the composition obtained from step S3 may contain CB15 derivative with different substituents. The substituent X can be H and the substituents Y and Z can be F. The composition may a include CB15 derivative, polymerizable nematic liquid crystal monomers, and photo initiator, mixed according to a mass ratio of 8.0%-87.6%-4.4%. At 25 degrees Celsius, the pitch length of the composition may be 7360 nm.

In step S4, a coating apparatus can spin, spray, or coat a layer of the composition on the first alignment layer. The thickness of the composition layer may be 920 nm.

In step S5, an illumination apparatus may illuminate the composition at 25 degrees Celsius.

In the above embodiment, the alignment orientation of the alignment stripes and the alignment orientation of the first alignment layer may form an angle of 45°.

In embodiments according to the present disclosure, the composition may include a CB15 derivative, polymerizable cholesteric liquid crystal monomers, polymerizable nematic liquid crystal monomers, and photo initiator. The mass ratio of the CB15 derivative may be 0-10%. The mass ratio of polymerizable cholesteric liquid crystal monomers may be 0-90%. The mass ratio of polymerizable nematic liquid crystal monomers may be 0-90%. The mass ratio of the photo initiator may be 5%.

The above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A composition for forming an alignment layer, comprising:
a chiral material;
polymerizable liquid crystal monomers; and
an initiator for triggering a polymerization reaction in the polymerizable liquid crystal monomers,
wherein the chiral material includes a CB15 derivative and the CB15 derivative has a molecular structure of with X, Y, and Z being H or F,
wherein the polymerizable liquid crystal monomers include: only polymerizable cholesteric liquid crystal monomers, or a combination of the polymerizable cholesteric liquid crystal monomers and the polymerizable nematic liquid crystal polymerizable monomers,
wherein the polymerizable liquid crystal monomers have a mass ratio of x in the composition, based on the total mass of the composition;
the chiral material has a mass ratio of y in the composition, based on the total mass of the composition;
the initiator has a mass ratio of about 0.03× to 0.05× in the composition; and
the values of x and y satisfy a equation of Bx+y=1, with 1.03≤b≤1.05 and 0.02≤y≤0.15.

2. The composition according to claim 1, wherein:
the polymerizable cholesteric liquid crystal monomers include 2-methyl-1,4-bis (4-(6'-propenyloxy hexyloxy) benzoyloxy) benzene; and the polymerizable nematic liquid crystal polymerizable monomers include 1,4-bis (4-(6'-propenyloxy hexyloxy) benzoyloxy)-2-toluene.

3. The composition according to claim 1,
wherein a mass ratio of the CB15 derivative is greater than 0 to 10%; a mass ratio of polymerizable cholesteric liquid crystal monomers is greater than 0 to 90%; a mass ratio of polymerizable nematic liquid crystal monomers is 0-90%; and a mass ratio of the initiator is 5% of the liquid crystal monomers, based on the total mass of the composition.

4. The composition according to claim 1, wherein the initiator is a photo initiator.

5. The composition according to claim 1, wherein the initiator is a photo initiator including dual benzoin methyl ether.

6. A display substrate including an alignment layer with at least a portion of the alignment layer being formed from a composition, the composition including:
a chiral material;
polymerizable liquid crystal monomers; and
an initiator for triggering a polymerization reaction in the polymerizable liquid crystal monomers,
wherein the chiral material includes a CB15 derivative and the CB15 derivative has a molecular structure of with X, Y, and Z being H or F, wherein the polymerizable liquid crystal monomers include: only polymerizable cholesteric liquid crystal monomers, or a combination of the polymerizable cholesteric liquid crystal monomers and the polymerizable nematic liquid crystal polymerizable monomers, wherein the polymerizable liquid crystal monomers have a mass ratio of x in the composition, based on the total mass of the composition;

the chiral material has a mass ratio of y in the composition, based on the total mass of the composition;

the initiator has a mass ratio of about 0.03x to 0.05x in the composition; and the values of x and y satisfy a equation of Bx+y=1, with 1.03≤b≤1.05 and 0.02≤y≤0.15.

7. The display substrate according to claim 6, wherein: the alignment layer includes first regions and second regions arranged in an alternating manner.

8. The display substrate according to claim 7, wherein: when the alignment layer is in contact with liquid crystal molecules, a first initial alignment orientation of the liquid crystal molecules in contact with the first regions is different from a second initial alignment orientation of the liquid crystal molecules in contact with the second regions.

9. The display substrate according to claim 8, wherein: the first initial alignment orientation of the liquid crystal molecules contacting the first regions differs from the second initial alignment orientation of the liquid crystal molecules contacting the second regions by m*D°, with D being less than or equal to 90, and m=1, 2, 3, or 4.

10. The display substrate according to claim 6, wherein: the alignment layer includes a first alignment layer and a second alignment layer on the first alignment layer;

the second alignment layer includes a plurality of separated alignment stripes, the alignment stripes being of the cured composition and forming the second regions; and regions on the first alignment layer between two adjacent alignment stripes of the second alignment layer form the first regions.

11. The display substrate according to claim 8, wherein: when the first initial alignment orientation of the liquid crystal molecules in contact with the first regions differs from the second initial alignment orientation of the liquid crystal molecules in contact with the second regions by m*D°, a thickness d of the alignment layer satisfies an equation of d=(n+m*D/360)P, with P being a pitch length of liquid crystal molecules formed by the polymerizable liquid crystal monomers, and n being a positive integer.

12. The display substrate according to claim 8, wherein: the first regions and the second regions are in a same alignment layer; and the first regions and the second regions are formed with the cured composition.

13. The display substrate according to claim 10, wherein: a width of the alignment stripe is 1/N of a width of a pixel, N being a positive integer greater than or equal to 2.

14. A display panel, including a display substrate, wherein the display substrate is the display substrate according to claim 6.

15. A method for manufacturing a display substrate, including:

forming a first alignment layer on the substrate;

coating a composition on the first alignment layer to form a second alignment layer, wherein the composition includes a chiral material, polymerizable liquid crystal monomers, and an initiator for triggering a polymerization reaction in the polymerizable liquid crystal monomers; and forming one or more alignment orientation by using one or more masks and one or more UV illuminations for exposing the second alignment layer, wherein the one or more masks includes alternating light-transmitting regions and opaque regions, wherein the chiral material includes a CB15 derivative and the CB15 derivative has a molecular structure of with X, Y, and Z being H or F, wherein the polymerizable liquid crystal monomers include: only polymerizable cholesteric liquid crystal monomers, or a combination of the polymerizable cholesteric liquid crystal monomers and the polymerizable nematic liquid crystal polymerizable monomers, wherein: the polymerizable liquid crystal monomers have a mass ratio of x in the composition, based on the total mass of the composition;

the chiral material has a mass ratio of y in the composition, based on the total mass of the composition;

the initiator has a mass ratio of about 0.03x to 0.05x in the composition; and the values of x and y satisfy a equation of Bx+y=1, with 1.03≤b≤1.05 and 0.02≤y≤0.15.

16. The method according to claim 15, further comprising:

forming a first initial alignment orientation of the liquid crystal molecules when regions of the first alignment layer under the opaque regions of a first mask are in contact with liquid crystal molecules; and forming a second initial alignment orientation of the liquid crystal molecules when regions of the second alignment layer under the light-transmitting regions of the first mask are in contact with liquid crystal molecules.

17. The method according to claim 16, wherein the UV illumination has an intensity of about 3 to 7 mW/cm², an exposure temperature of about 25 to 45 degrees Celsius, and an exposure duration of about 30 to 50 minutes.

18. The method according to claim 15, further comprising:

removing portions of the second alignment layer to form the alignment stripes of the second alignment layer after one light exposure.

19. The method according to claim 18, further comprising:

removing the portions of the second alignment layer by dichloromethane.

20. The method according to claim 15, wherein forming one or more alignment orientation comprises:

applying a first mask, wherein the first mask includes alternating first light-transmitting regions and first opaque regions;

applying a UV illumination for exposing the second alignment layer;

applying a second mask, wherein the second mask includes alternating second light-transmitting regions and second opaque regions, locations of the second light-transmitting regions are same as locations of the first opaque regions, locations of the second opaque regions are same as locations of the first light-transmitting regions; and applying a UV illumination for exposing the second alignment layer.

* * * * *